G. A. LUTZ.
MEANS FOR PROTECTING CONDUIT OR PIPE THREADS.
APPLICATION FILED NOV. 23, 1916.
1,271,187.
Patented July 2, 1918.
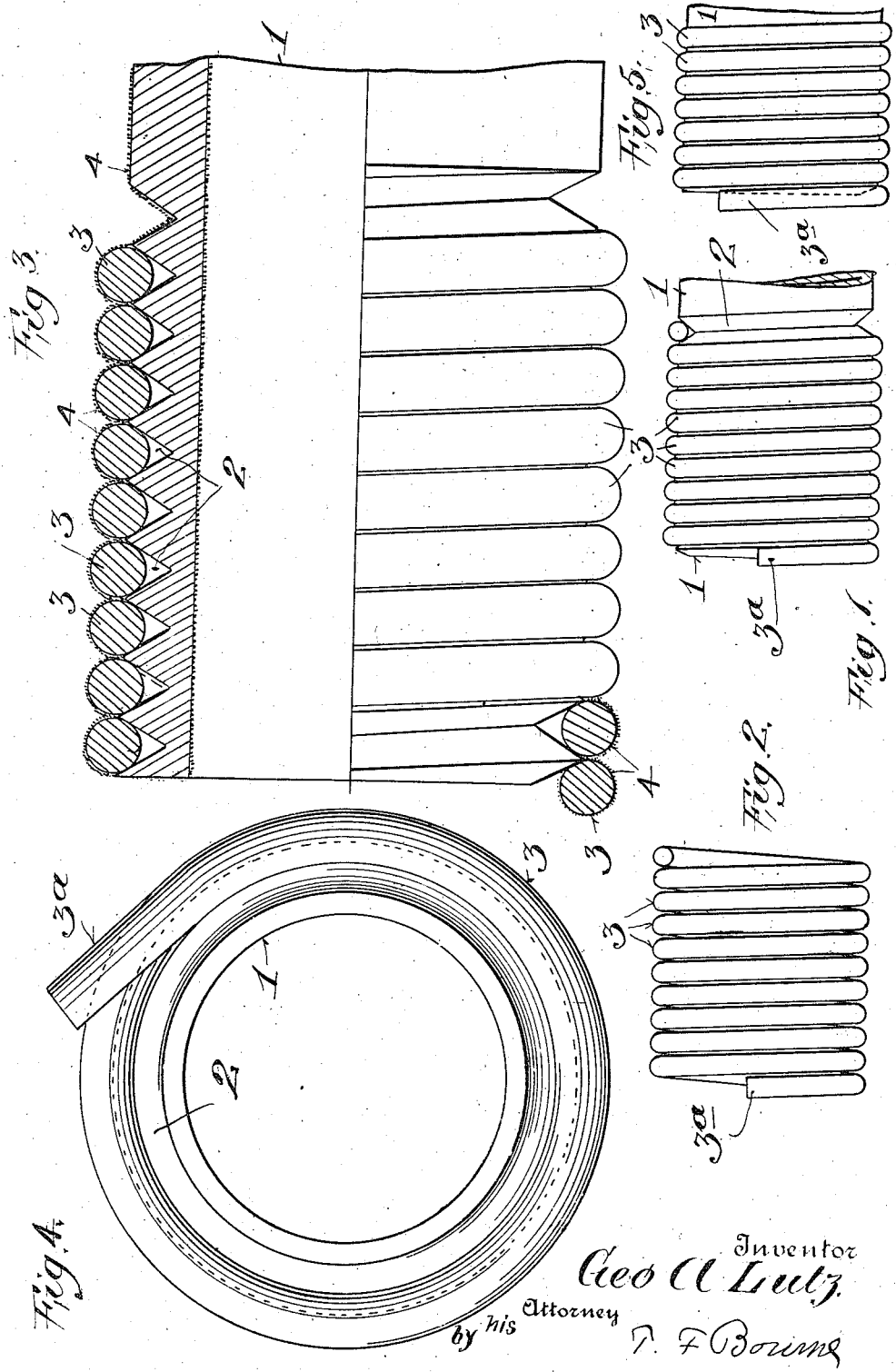
Inventor
Geo A Lutz
by his Attorney
T. F. Bourne

UNITED STATES PATENT OFFICE.

GEORGE A. LUTZ, OF CRANFORD, NEW JERSEY, ASSIGNOR TO AMERICAN CIRCULAR LOOM COMPANY, OF PITTSBURGH, PENNSYLVANIA, A CORPORATION OF PENNSYLVANIA.

MEANS FOR PROTECTING CONDUIT OR PIPE THREADS.

1,271,187.     Specification of Letters Patent.     Patented July 2, 1918.

Application filed November 23, 1916. Serial No. 132,925.

*To all whom it may concern:*

Be it known that I, GEORGE A. LUTZ, a citizen of the United States, and resident of Cranford, in the county of Union and State of New Jersey, have invented certain new and useful Improvements in Means for Protecting Conduit or Pipe Threads, of which the following is a specification.

When metal pipes or tubes, commonly called conduits, having exterior threads at one or both ends, are handled or transported, the threads are liable to become injured, and, when such threaded conduits are coated with insulating material it is liable to enter the threads and interfere with the screwing of sleeves or other couplings on the threads of the conduits. Various means have been adopted for protecting the threads on such conduits when they are coated with insulating material, such as by screwing threaded metal sleeves on the threads of the conduits, or by applying paper protectors on such threads. While such sleeves protect the threads of the conduits from the insulating material and from injury during transportation, the sleeves are costly and require to be unscrewed from the conduits when the latter are to be utilized, and the paper caps are also costly, and portions of the paper are liable to stick to the threads of the conduits when being broken away from the threads, and such caps do not afford the complete measure of protection to the threaded portions of the conduits during transportation that are afforded by the aforesaid metal sleeves.

The object of my invention is to provide simple, cheap and efficient means to protect the threaded ends of such conduits during handling and transportation and when being coated, particularly when coated with insulation, commonly called enamel, that is baked on the conduits, which means may be readily and quickly removed from the conduits without unscrewing therefrom, and will carry away any coating material that has been applied upon such means.

In carrying out my invention I cover the threads of the conduits with coils or windings of pliable wire adapted to be removed from the conduits merely by pulling upon the coil or winding to cause it to unwind or strip from the threads of the conduits and leave the latter exposed, without requiring the winding to be unscrewed from the thread. I provide protectors comprising helically coiled pliable wire, wound in such manner as to screw upon the threads of the conduits, and so arranged that when the outer ends of such coils are pulled they will unwind and elongate in removal from the conduits. The coils referred to, when on the conduits, protect the threads thereof, not only during handling and transportation, but when the conduits are dipped in enamel or other insulating compound, or coated in any other manner, and such coils will reduce the access of the compound or coating to the threads of the conduits and the coating that adheres to such coils will be removed therewith from the conduits, leaving the threads on the latter relatively clean.

Reference is to be had to the accompanying drawings forming part hereof, wherein, Figure 1 is a side view of a portion of a conduit having my improved protector upon its threaded end;

Fig. 2 is a detail view of the protector detached from the conduit;

Fig. 3 is a partially longitudinal section of Fig. 1 on an exaggerated scale;

Fig. 4 is an end view of Fig. 3; and

Fig. 5 is a detail hereinafter referred to.

In the accompanying drawings the numeral 1 indicates a pipe or tube, commonly called a conduit, and for the purpose of this specification I will refer to the pipe or tube as a conduit. At one or both ends the conduit is provided with threads 2 in any well known manner. At 3 is indicated my improved protector adapted to fit over or upon the thread of the conduit to protect the same. The protector 3 is shown comprising a helically wound pliable wire of suitable gage, preferably such gage as to snugly fit the thread 2 of the conduit. The protectors may be made by winding the wire of proper diameter to screw snugly upon the threads of the conduits, and by cutting the coil or winding to length substantially equal to the lengths of the threads on the conduits to which the protectors are to be applied.

In cases where the conduits are to be covered with a coating the protectors 3 will be applied upon the threads of the conduits before the application thereto of the coating material, whereby the protectors will reduce the liability of or prevent the coating from being applied to the underlying threads of the conduits. When unprotected conduits or pipes have been provided with insulating coatings, and particularly where the conduits or pipes have been dipped in the coating material, and then baked, the coating material has adhered to the threads on the conduits, and has interfered with the screwing thereon of sleeves or other couplings, requiring, in some instances, the removal of the insulation or enamel from the threads of the conduits before the sleeves or fittings could be properly applied thereto. My improved protector, when upon the thread of the conduit that is dipped with the protector into the insulating or enameling material, will exteriorly receive such material, as indicated at 4, which may make a continuous coating along the conduit and along the exterior of the protector, as illustrated in Fig. 3, thereby tending to exclude atmosphere from the thread 2 as well as to keep the material 4 from unduly coating such thread. The protector also affords protection to the underlying thread of the conduit during handling and transportation, whether the protector be coated or not. My improved protector may also be applied upon the threads of conduits when the latter are to be plated with zinc or other metal coatings, either by electro-deposition or hot dipping, (such as electro-galvanizing or hot galvanizing), whereupon the metal coatings may adhere to the protectors 3, or the latter may be screwed upon the threads of the conduits after the metal coating has been applied thereto, the protectors in either instance protecting the threads of the conduits, during handling or transportation. When the protector is to be removed from the conduit, it is merely necessary to grasp an end of the wire comprising the protector and pull it in the general direction of the length of the conduit, whereupon the protector will readily and quickly uncoil or unwind from the conduit thread, carrying away with it any of the coating that may have adhered to it and leaving the thread of the conduit relatively clean from such coating and ready to receive a sleeve, coupling or the like. The coils or winding of the protector are not secured together, hence they can readily follow the thread on the conduit when being screwed thereon, and will readily separate and uncoil or unwind when the protector is pulled at its end, the pliability of the wire permitting such advantageous results. This capacity of removability of the protector from the thread of the conduit by elongation and uncoiling of the wire coil, permits the quick detachment of the coil from the conduit, without requiring it to be unscrewed, since with such wire coils the tendency would be to tighten on the conduit thread were the coiled protector unscrewed, this being particularly so because the coils are not secured together. Since the coils of the protector are shown slightly separated over the peak of the thread of the conduit any enamel or insulation that may lead between the coils to the peak of the thread will be broken and mainly carried away with the wire when the protector is removed by pulling it, as stated before.

The protector is so constructed that when it is on a conduit thread the outer end of the protector is in position to be freely grasped by the fingers or a tool to permit the wire to be pulled. This may be effected by terminating the wire of the coil out of mesh with the thread of the conduit at the extreme outer end of the latter, such as by offsetting such end of the wire with respect to the curvature of the coil, such as by terminating the end 3ª of the wire at a tangent to the coil or out of the plane of the coil, or by proportioning the length of the coil to the length of the thread of the conduit, to allow the extreme end of the coil to project beyond the end of the conduit, (Fig. 5).

Having now described my invention what I claim is:—

1. The combination of a conduit having a threaded portion, with a protector comprising a helical coil of pliable wire upon the threaded portion of the conduit, the windings of the coil being free to elongate and uncoil for removal from the conduit.

2. The combination of a conduit having a threaded portion, with a protector comprising a helical coil of pliable wire upon the threaded portion of the conduit, the windings of the coil being free to elongate and uncoil for removal from the conduit, and insulating material upon the conduit and upon the protector.

3. The combination of a conduit having a threaded portion, with a protector comprising a helical coil of pliable wire upon the threaded portion of the conduit, the coils of the protector being spaced apart.

4. The combination of a conduit having a threaded portion, with a protector comprising a helical coil of pliable wire upon the threaded portion of the conduit, the coils of the protector being spaced apart over the peak of the thread, and insulating material upon the conduit and upon the protector and in such spaces between the coils adapted to be broken and carried away with the wire when the protector is elongated and uncoiled for removal from the conduit.

5. A conduit-thread protector comprising a helical coil of pliable wire adapted to be screwed upon such thread and to elongate and unwind when pulled lengthwise from the conduit.

6. A conduit-thread protector comprising a helical coil of pliable wire adapted to be screwed upon such thread and to elongate and unwind when pulled lengthwise from the conduit, the coils of the protector being disconnected from each other.

7. A conduit-thread protector comprising a helical coil of pliable wire adapted to be screwed upon such thread and to elongate and unwind when pulled lengthwise from the conduit, the coils of the protector being disconnected from each other and spaced apart to freely follow the thread of a conduit when being screwed thereon.

8. A conduit-thread protector comprising a helical coil of pliable wire adapted to be screwed upon such thread and to elongate and unwind when pulled lengthwise from the conduit, the outer end of the coil being offset with respect to the curvature thereof and terminating without the bore of the coil.

9. The combination of a conduit having a threaded portion, with a protector comprising a helical coil of pliable wire upon the threaded portion of the conduit, the windings of the coil being free to elongate and uncoil for removal from the conduit, the end portion of the coil at the outer end of the conduit being out of mesh with the thread thereof and terminating without the bore of the conduit.

Signed at New York city, in the county of New York and State of New York this 21st day of November, A. D. 1916.

GEORGE A. LUTZ.

Witnesses:
T. F. BOURNE,
MARIE F. WAINRIGHT.